United States Patent [19]

Moehrmann

[11] Patent Number: 5,543,951
[45] Date of Patent: Aug. 6, 1996

[54] METHOD FOR RECEIVE-SIDE CLOCK SUPPLY FOR VIDEO SIGNALS DIGITALLY TRANSMITTED WITH ATM IN FIBER/COAXIAL SUBSCRIBER LINE NETWORKS

[75] Inventor: Karl-Heinz Moehrmann, Munich, Germany

[73] Assignee: Siemens Aktiengesellschaft, Munich, Germany

[21] Appl. No.: 386,466

[22] Filed: Feb. 19, 1995

[30] Foreign Application Priority Data

Mar. 15, 1994 [EP] European Pat. Off. .............. 94104201

[51] Int. Cl.⁶ .......................... H04B 10/00; H04J 14/08; H04J 3/24
[52] U.S. Cl. .................... 359/158; 359/137; 375/354; 370/94.2; 370/100.1
[58] Field of Search .................................. 359/135, 137, 359/138, 139, 140, 123, 125, 136, 118, 121, 167, 168, 158; 370/94.1, 94.2, 98, 100.1, 110.4, 105.3, 110.1; 375/354, 371; 348/7, 12, 17

[56] References Cited

U.S. PATENT DOCUMENTS

| | | | |
|---|---|---|---|
| 4,591,906 | 5/1986 | Morales-Garza et al. | 358/84 |
| 4,991,975 | 2/1991 | Alferness et al. | 359/139 |
| 5,007,070 | 4/1991 | Chao et al. | 359/137 |
| 5,150,247 | 9/1992 | Sharpe et al. | 359/135 |
| 5,373,386 | 12/1994 | Bolze | 359/140 |
| 5,390,185 | 2/1995 | Hooijmans et al. | 370/98 |
| 5,398,129 | 3/1995 | Reimann | 359/137 |

FOREIGN PATENT DOCUMENTS 0171080 12/1986 European Pat. Off. .
0460398 11/1991 European Pat. Off. .

OTHER PUBLICATIONS

Telephony—Time Warner's Magic Kingdom—Richard Karpinski, Technical Editor, Nov. 1, 1993, pp. 48–53.
BR Telcom Technical Journal, vol. 7, No. 2, "The provision of telephony over passive optical networks", C. E. Hoppitt et al., Apr. (1989), pp. 100–113.
Electronics Letters, vol. 24, No. 21, "Channel Digital TV Distribution System Operating At 4.4 Gbit/s", Smith et al, Oct. 13, 1988, pp. 1336–1338.
International Broadcasting Convention, "Digital HDTV Signal Transmission On Optical Fibre", H. Fourdeux et al, Sep. 23, 1988, pp. 280–283.
IEEE Journal on Selected Areas in Communications, vol. 8, No. 7, "Fiber–Optic Subcarrier Multiplexing Video Transport Employing Multilevel QAM", N. Kanno et al., pp. 1313–1319.
IEEE Global Telecommunications Conference, vol. 1, "A Proposed Loop Transmission System Based On A Switched Broadband Digital Access For Enhanced Video and Data Services", M. Nikain et al., Dec. 2, 1991, pp. 607–611.

(List continued on next page.)

Primary Examiner—Leo Boudreau
Assistant Examiner—Bhavesh Mehta
Attorney, Agent, or Firm—Hill, Steadman & Simpson

[57] ABSTRACT

For the receive-side clock supply for digital signals, such as digital data-compressed TV distribution signals, transmitted from a digital signal source, such as a TV signal source, via a connection unit and a light waveguide and/or coaxial line tree network connected thereto and respectively shared in common by a plurality of subscriber-side network termination units to the subscriber-side network termination units in the form of ATM signals, the required signal clock or clocks are separately transmitted at least proceeding from the connection unit to all network termination units connected to the light waveguide and/or coaxial line tree network. The digital signal acquired from the received ATM cells is thus time-regenerated thereat.

19 Claims, 2 Drawing Sheets

OTHER PUBLICATIONS

Symposium Record CATV Sessions, 16th International TV Symposium, "Multichannel Fibre Optic Transmission System at 1.3 Gibt/s Digital TV Signal Processing for TV Transmission in Optical Fiber Networks", by T. von Lingelsheim et al, Jun. 1989, pp. 217–229.

ISSLS, (1988) Conference papers 9.4.1–5, "Passive Fibre Local Loop For Telephony With Broadband Upgrade", by K. A. Oakley et al, pp. 179–183.

Femmeldeingenieur 46 (1992), 10, FIG. 11.2, OPAL 4 (Siemens and Kathrein Leipzig), p. 11.

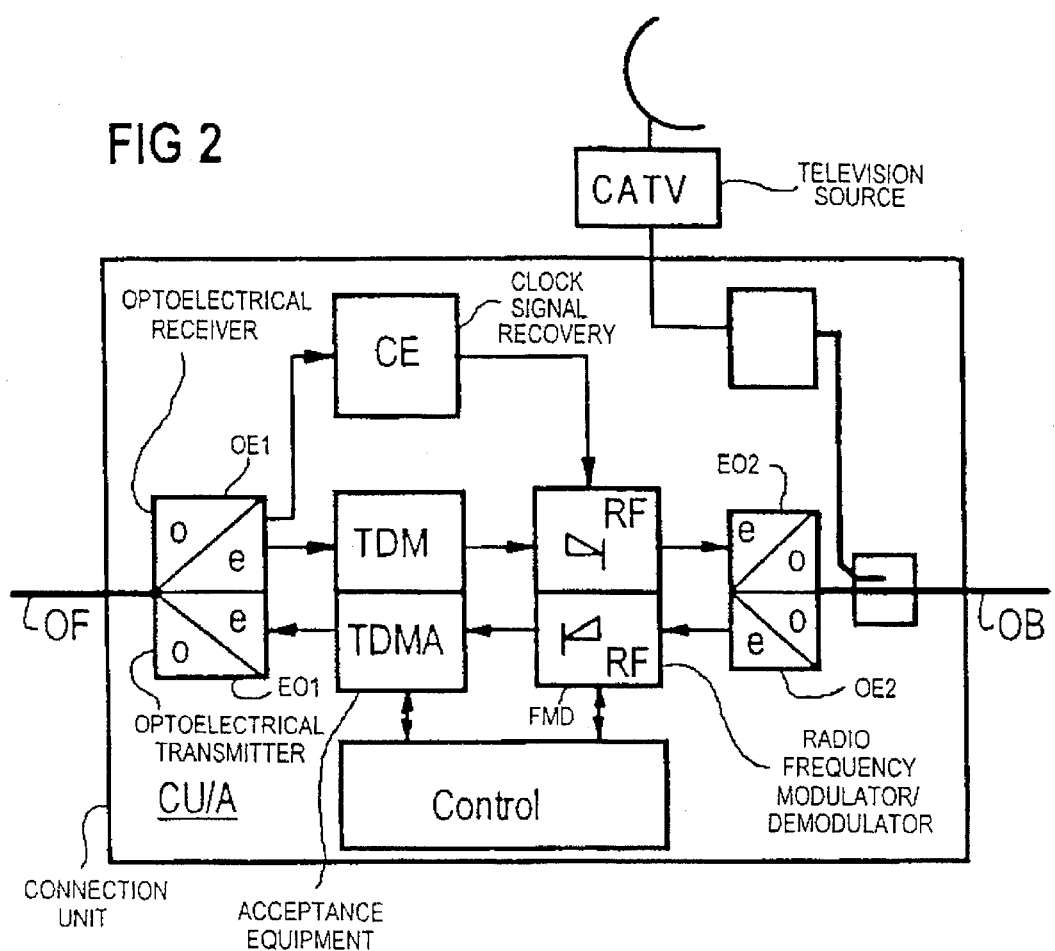
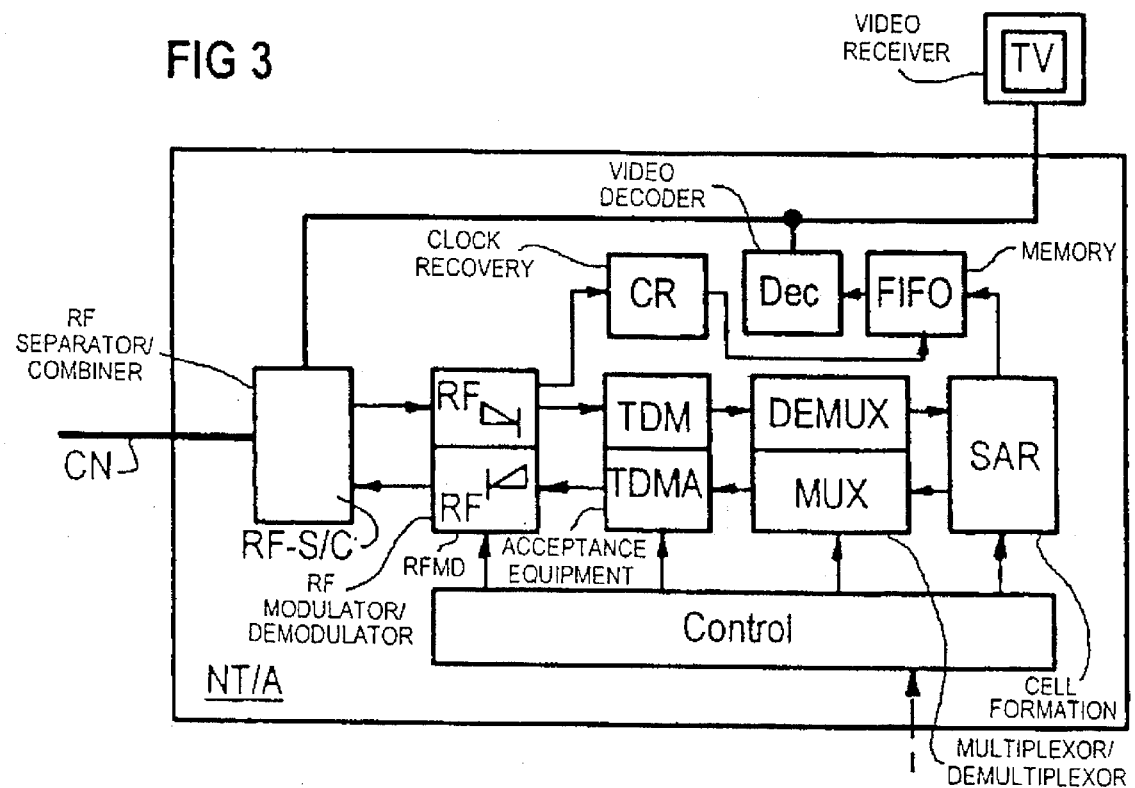

METHOD FOR RECEIVE-SIDE CLOCK SUPPLY FOR VIDEO SIGNALS DIGITALLY TRANSMITTED WITH ATM IN FIBER/COAXIAL SUBSCRIBER LINE NETWORKS

BACKGROUND OF THE INVENTION

Recent developments in telecommunication technology have led to passive optical telecommunication systems at the level of the subscriber lines wherein a respective plurality of decentralized equipment (subscriber stations or what are referred to as distant units respectively combining a plurality of subscriber stations) are respectively connected via a separate light waveguide line to an optical brancher that is connected to a common light waveguide terminal of a centralized equipment (particularly represented by a switching center) via a light waveguide bus. They are connected thereto either directly or via at least one further optical brancher (see European reference EP-A-0 171 080; ISSLS '88, Conf. Papers 9.4.1 . . . 5; and BR Telecom Technol. J. 17(1989)2, 100 . . . 113).

In such a passive optical telecommunication network, the signal transmission proceeding from the centralized equipment downstream to the decentralized equipment can occur in the TDM cell stream from which each decentralized equipment takes only the cells intended for precisely this decentralized equipment. The signal transmission from the decentralized equipment upstream to the centralized equipment can be carried out in a TDMA method, in accord wherewith a decentralized equipment transmits each burst synchronized using a delay means individually set apparatus-associated by the central equipment (see European reference EP-A-0 460 398).

The signal transmission downstream proceeding from the centralized equipment to the decentralized equipment and the signal transmission proceeding from the decentralized equipment upstream to the centralized equipment can thereby be carried out in one and the same wavelength window (for example, in wavelength common frequency mode at 1.3 µm).

The introduction of new broadband communication services is quite generally dependent on the nature and scope of the telecommunication infrastructures that are already present together with the telephone communication services offered therein and on the demand for broadband telecommunication possibilities. The potentially greatest volume of connections can be seen in the area of private households. This potential of connections, however, will not be reflected in an effective demand for connections without appropriate low costs of a broadband subscriber terminal.

In order to enable a subscriber to use broadband ISDN services (for example, interactive video calling video on demand (VoD), teleshopping, information searching, and narrow band services such as (N-) ISDN or traditional telephony (POTS)), various connection possibilities are currently being considered. Solutions wherein infrastructure can be used that already exists are especially attractive. For example, the coaxial cable networks of the CATV operators represent an appropriate medium. The frequency range of, for example, 50 through 450 MHz is utilized by conventional, analog signal television channels; the range below and above the analog signal telephone distribution has been free up to now and can be exploited for new services. A sub-range of the range that was free is being used for what is referred to as cablephone in the United States by some cable TV companies. Other operators are envisioning a comprehensive system that offers a majority of the aforementioned services within the framework of an access network, for example on an ATM basis (AN/A), whereby an optical offering line (fiber feeder) must usually precede the coaxial sub-networks because of the limited range (TELEPHONY, 1 November 1993, 48 . . . 53).

A further, passive optical network (PON) for bi-directional, interactive, switched telecommunication has already been utilized (Der Fernmeldeingenieur 46(1992)10, FIG. 11.2—System OPAL 4), in addition to a passive optical network (PON) with expansion by a coaxial line tree network for unidirectional distribution of communication (TV).

According to an even more advantageous fashioning of a subscriber line network having coaxial line tree networks respectively shared in common by a plurality of subscriber-side line termination units and having light waveguides that connect these coaxial line tree networks to connection equipment, the coaxial line tree networks can be connected via a respective converter equipment to a light waveguide tree network containing optical brancher. This light waveguide tree network is designed both for bi-directional telecommunication services, preferably in bidirectional wavelength division mode, as well as, unidirectional distribution communication services. This enables an extremely economical coverage of a great number of subscribers both with distribution communication services as well as with interactive, switched telecommunication services.

The light waveguide tree network can thereby be a passive optical network or can be an active optical network provided with amplifiers or can also be a simple point-to-point connection. Regardless thereof and independently of one another, the individual coaxial line tree networks can be amplifier-free passive coaxial line tree networks or active coaxial line tree networks provided with amplifiers. This flexibility also enables the realization of networks having substantially different ranges. The bi-directional or, respectively, interactive telecommunication services can be implemented with digital signals transmitted in the form of ATM signals.

In bidirectional digital signal communications, the bit rates from and to the subscriber can differ. The bit rate required by a subscriber can also be individually assigned to each subscriber. The bit rates also do not need to be uniform on the individual coaxial line networks. On the contrary different transmission bit rates for the two transmission directions can also be provided on each coaxial line network. The bit rates of the two transmission directions can also differ on the light waveguide tree network. They can be selected independently of the bit rates of the coaxial line tree networks. When light waveguide tree network and coaxial line tree network use different bit rates, then a rate matching occurs in the converter equipment lying between light waveguide tree network and coaxial line tree network.

FIG. 1 schematically shows an example of such a subscriber line network. Coaxial line networks CN having the standard tree structure are indicated in the right-hand part of the drawing. At the subscriber's side, the coaxial lines are respectively terminated with a network termination means NT/A which is capable of converting its reception and transmission signals such that the connection of standard terminal equipment is possible. A network termination means NT/A has, for example, terminals for distributed television or video on demand, for traditional telephony (POTS) and/or narrow band ISDN, or for any desired broadband ISDN service as well.

At the side facing away from the subscribers, the coaxial line networks CN are respectively connected via an opto/coax converter equipment (Optical/Coax-Converter) OCC to an optical central office line of a light waveguide network OB branched via optical branchers (Splitters) V that connects the coaxial line networks to a connection unit CU/A preferably formed with an (ATM) cross-connect. As also indicated in FIG. 1, a plurality of such light waveguide networks OB can be connected to such a connection unit CU/A. Correspondingly, as likewise indicated in FIG. 1, a plurality of, for example, up to four coaxial line subnetworks CN can be connected to a converter equipment OCC. When a coaxial line network CN enables the connection of, for example 100 subscribers, the converter equipment OCC services, for example, 400 subscribers and the connection unit CU/A services, for example, 2000 through 4000 subscribers.

The transmission in the subscriber line network can be undertaken on the basis of ATM cells (cell-based) with a system-specific overhead. The data rate in the transmission direction toward the subscriber (downstream) will thereby be greater at, for example, 622 Mbit/s than the data rate in the opposite transmission direction (upstream) with, for example, 155 Mbit/s, whereby the downstream transmission can be undertaken in a plurality of channels (for example, in four channels of 155 Mbit/s each) from a transmission-oriented point of view.

In the system outlined in FIG. 1, analog TV distribution signals are supplied proceeding from a CATV source into the connection unit CU/A shared in common by the connected subscribers and are transmitted to all connected subscribers. At the subscriber these television signals can be received in a standard way by a television receiver TV in FIG. 1 that is connected to the line termination means NT/A.

In addition to the analog TV signals, let digital signals in the ATM format be supplied to the connection units CU/A in the telecommunication system outlined in FIG. 1. For example, such signals can be digital video signals of a video-on-demand service (also including an ATM return channel for the program selection by the TV subscribers) or broadband interactive data signals, whereby the digital video signals are likewise received by the television receiver TV with a corresponding auxiliary device (set top box) that is not separately shown in FIG. 1.

Further, narrow band ATM voice and, potentially, data signals as well can be transmitted in both directions in the system outlined in FIG. 1, this being indicated in FIG. 1 by a telephone connected to the network termination means NT/A. Further services that can require the connection of further terminal equipment to the respective network termination means NT/A are possible without being depicted in FIG. 1.

The ATM signals are conducted via an ATM switching equipment ASN. For video- on-demand, a video server VS is required wherein the video programs (films) to be called in are stored, namely in digital and data-compressed form as a rule, for example according to the MPEG2 algorithm with, for example, 4 Mbit/s produced at the ISO-MPEG. Let the server VS be controlled by a controller VODC that evaluates signalling information coming from the connected subscribers via the respective return channel and correspondingly controls both the program output from the video server VS as well as the ATM switching equipment ASN.

The general employment of the asynchronous transfer mode (ATM) for digital signals of all services (with the exception of the TV distribution service based on analog signal transmission) is extraordinarily advantageous because of its great flexibility. Signals having different, arbitrary data rates can be mixed as desired. A selection of data rates corresponding to specific hierarchy levels is superfluous. This is also extremely interesting particularly for a video transmission since, on the one hand, a universally declared data rate for a video signal does not exists anyway and, on the other hand, different picture qualities can be offered by the selection of different data rates. This is particularly interesting in conjunction with a scalable coding, whereby a high quality, for instance on the basis of an HDTV signal having a high data rate, or a lower quality, for instance with a TV signal having 625 line resolution, can be optionally offered to the subscribers (at different prices).

As is shown in practice, the recovery of a stable clock signal at the receive side is indispensable for the faultless functioning of the receive-side decoder, particularly given digital, data-compressed video signals transmitted in the form of ATM signals. In an ATM system, the signal transmission is fundamentally asynchronously undertaken, i.e., the individual ATM cells in fact arrive in the proper sequence in the receiver but at non-uniform time intervals. The recovery of an adequately stable reception clock is thereby in fact fundamentally possible, for instance by employing a large buffer memory for smoothing the data stream (with the consequence of an undesired signal delay), or on the basis of the co-transmission of regularly mixed-in timing marks, among others. Such measures, however, are complicated and expensive. As already mentioned, a cost-optimized solution specifically at the subscriber equipment is of great significance for the acceptance of the system.

SUMMARY OF THE INVENTION

The present invention provides a more advantageous acquisition of a stable, receive-side clock information for potentially data-compressed ATM video signals.

The present invention is directed to a method for the receive-side clock supply for digital signals, particularly digital, data-compressed TV distribution signals, transmitted from a digital signal source, particularly a TV signal source, via a connection unit and a light waveguide and/or coaxial line tree network connected thereto and respectively shared in common by a plurality of subscriber-side network termination units to the subscriber-side network termination units in the form of ATM signals. This method is inventively characterized in that the signal clock or clocks required is/are transmitted, at least proceeding from the connection unit, separately to all network termination units connected to the light waveguide and/or coaxial line tree network, where the digital signal acquired from the received ATM cells is thus time regenerated.

The present invention, which proceeds on the basis that only a finite plurality of different data rates is employed for the (video) signal coding, yields the advantage that the signal clocks can be transmitted from the (video) signal source up to the connection unit in such a way (for example, with timing marks in the form of specific ATM cells mixed thereinto) that they can involve a higher outlay for the transmission or, respectively, recovery of a stable clock signal. The present invention has this advantage since this can occur in common for all subscribers connected to the appertaining (video) signal source via the connection unit, but that the subscriber-associated outlay to be exerted can be kept relatively low for the clock recovery.

In a further development of the present invention, the signal clock or clocks required can be transmitted from the connection unit in the form of pilot signals, being transmitted via the light waveguide and/or coaxial line tree network to all network termination units connected thereto.

Each clock frequency can thereby be directly derived from a transmitted pilot frequency that is transmitted in a range that is not otherwise spectrally used, for example below 10 MHz. It is transmitted via the optical fibers or, respectively, via the coaxial line tree network to the subscriber-side termination equipment. The pilot frequencies are expediently linked to the required clock frequencies in a simple manner, for example in the form of their whole-numbered parts or, fractions, or multiples. An acquisition in a simple manner of the pilot frequencies in the terminating equipment is thus possible with filters. With a FIFO memory, the digital TV signal acquired from the received ATM cells is time regenerated, i.e., is read in with a jitter-infested clock and is read out with the stable clock and is supplied to the video decoder.

Alternatively, it is also possible to define pilot frequencies that are not numerically linked to the clock frequencies and to modulate these carriers with the required clock frequencies. This enhances the flexibility in the spectral allocation. Here, too, the clock frequencies can be recovered at the receive side by simple measures such as filtering, demodulation.

In another alternative embodiment of the present invention, clock frequencies that can be numerically derived in a simple manner from the clock frequency of one of the ATM signals (for example, 149.76 MHz corresponding to VC-4 of the synchronous digital hierarchy) transmitted downstream to all network termination equipment can be employed for the video signals given a network-wide, frequency-oriented synchronization of the video coders or, respectively, servers and of the connection units. The transmission of additional pilot signals can thereby be eliminated.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 schematically depicts a connection unit used in the FIG. 1 network; and

FIG. 3 schematically depicts a network termination unit used in the FIG. 1 network.

DESCRIPTION OF THE PREFERRED EMBODIMENTS

Figure 1:
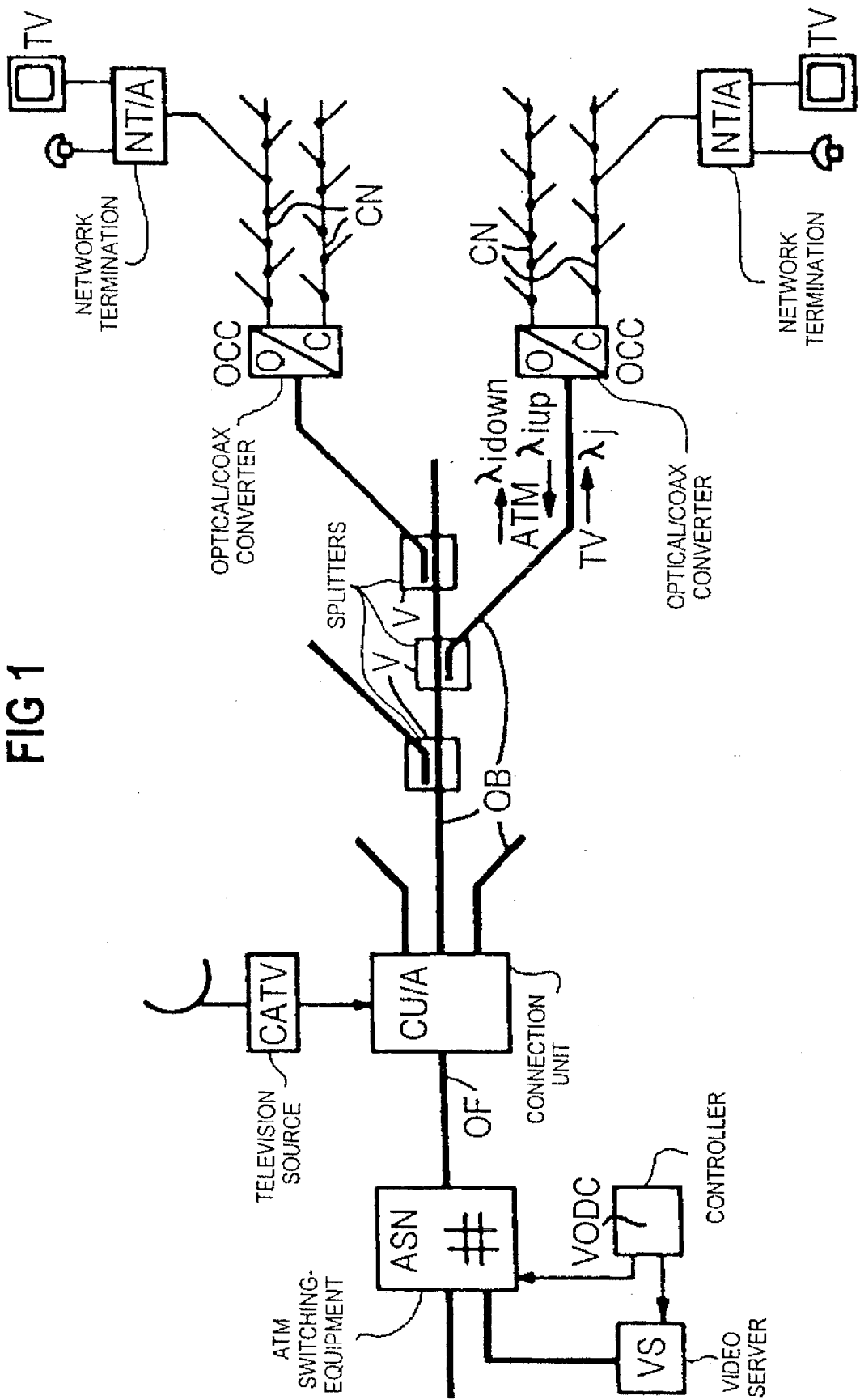
FIG. 1 schematically depicts a subscriber line network.

Circuit oriented details of a connection unit CU/A is depicted in FIG. 2. Let the connection unit CU/A be connected to an ATM switching equipment (ASN in FIG. 1) via a light waveguide (optical feeder) OF at the side facing away from the subscribers. Let the connection unit CU/A be connected to a subscriber-associated network termination equipment (NT/A in FIG. 1) at the side facing toward the subscriber via a light waveguide tree network OB (also see FIG. 1) and coaxial line tree networks (CN in FIG. 1) following thereupon. The light waveguide OF is terminated in the connection CU/A with an opto-electrical receiver OE1 and electro-optical transmitter EO1. The light waveguide tree network OB is terminated in the connection unit CU/A with an opto-electrical receiver OE2 and electro-optical transmitter EO2. Equipment TDM/TDMA effect the acceptance of ATM cells intended for the connection unit CU/A from the TDM cell stream transmitted downstream via the light waveguide OF and effect the output of ATM cells to be transmitted upstream in a TDMA method via the light waveguide OF. Furthermore, the equipment TDM/TDMA effect the acceptance of ATM cells intended for the connection unit CU/A from the TDMA cell stream transmitted upstream via the light waveguide OB and the output of ATM cells to be transmitted downstream via the light waveguide OB. This is effected according to principles that are intrinsically known and therefore need no further explanation here. A radio frequency modulator/demodulator FMD is also provide. The ATM signals, also including digital TV signals, accepted in downstream direction via TDM/TDMA acceptance equipment and RF modulator from the light waveguide OF are forwarded to the light waveguide tree network OB. The TDMA equipment for the transmission via the light waveguide OF can also be replaced by a TDM multiplexor given pure point-to-point transmission. As was already set forth above in conjunction with FIG. 1, let clock signals deriving from the respective TV signal source video server (VS in FIG. 1) for the digital TV signals transmitted in the TDM cell stream be contained, for example in the form of specific ATM cells that represent timing marks that have been mixed in, in the TDM cell stream transmitted in downstream direction. In order to recover a stable clock signal therefrom, a clock signal recovery means CE is connected to the opto-electrical receiver OE1. Clock signal transmission to the connection unit CU/A and clock signal recovery in the connection unit CU/A can be relatively expensive since they proceed in common for all subscribers (NT/A in FIG. 1) connected to the appertaining video server (VS in FIG. 1) via the connection unit CU/A. These two procedures, however, need not be set forth in greater detail here since this is not required for an understanding of the present invention.

At its output side, the clock signal recovery means CE then leads to the RF modulator of the connection unit CU/A, so that the signal clocks that are required and that are recovered in the clock signal recovery means CE are transmitted proceeding from the connection unit CU/A separately in the form of pilot signals. These pilot signals are transmitted via the light waveguide and/or coaxial line tree network OB/CN (in FIG. 1) to all network termination units NT/A (in FIG. 1) connected thereto.

The pilot signals can be transmitted to the subscriber-side terminating equipment NT/A via the optical fibers OB or, respectively, via the coaxial tree networks CN in a range that is not otherwise spectrally utilized, for example below 10 MHz. The appertaining clock frequency can be directly derived from the respective pilot frequency. To that end, the selected pilot frequencies are expediently linked in a simple way with the required clock frequencies, preferably in the form of whole-numbered parts or fractions or multiples of these clock frequencies. The restoration of the clock frequencies is then possible in a simple way in the subscriber-side network termination equipment NT/A by filtering.

Alternatively thereto, it is also possible to define pilot frequencies that are not numerically linked to the required clock frequencies and to then modulate these with the required clock frequencies. This is connected with an enhanced flexibility in the spectral allocation. The clock frequencies can also be thereby recovered in a simple way in the subscriber-side network termination equipment NT/A by filtering and demodulation.

Given network-wide, frequency-wise synchronization of the (TV) signal sources (VS in FIG. 1) and of the connection units (CU/A in FIG. 1 and in FIG. 2), the clock frequencies for the video digital signals can also be limited to values in a further alternative that can be numerically derived in a simple way from the clock frequency (for example, 149.76 MHz corresponding to the bit rate of a VC4-signal of the synchronous digital hierarchy SDH) of one of the ATM signals transmitted downstream to all network termination equipment NT/A. The transmission of additional pilot signals can then be eliminated. The video servers (VS in FIG. 1) are synchronized to this frequency for the read-out.

With the signal clocks transmitted separately in this way from the connection unit CU/A (in FIG. 1 and FIG. 2) via the light waveguide or, respectively coaxial line tree network OB-CN (in FIG. 1) to all network termination units NT/A connected thereto, the (video) digital signal acquired from the received ATM cells is finally time-regenerated in the respective network termination unit NT/A (see FIG. 3). The circuit-oriented details of a network termination means NT/A which shall be assumed to terminate a coaxial line CN of the coaxial line tree network (CN in FIG. 1), that are relevant for the understanding of the present invention, is schematically depicted in FIG. 3. An RF Separator/Combiner RF-S/C, to which an RF Modulator/Demodulator RFMD is connected, forms the termination at the coaxial line side. This is followed by a means TDM/TDMA. Let this effect the acceptance of ATM cells from the TDM cell stream transmitted downstream intended for the network termination means NT/A and effect the output of ATM cells to be transmitted upstream in a TDMA method according to principles that known and that therefore require no further explanation here. TDM/TDMA means is followed by a demultiplexor MUX/DEMUX, as well as, a means SAR for cell formation (segmentation) and cell reassembling, but this shall not be pursued further here since this is not required for an understanding of the present invention.

According to FIG. 3, a means CR for clock recovery is connected to the RF demodulator. Let this means CR recover the signal clock or clocks required for the reception of (TV) digital signals in the afore-mentioned way, the (video) digital signal acquired from the received ATM cells being time regenerated therewith. As also depicted in FIG. 3, this ensues with a FIFO (first in first out) memory into which the (video) digital signal that is acquired from the received ATM cells and that, thus is initially still clock jittered is read in with the jitter-infested clock proceeding from the segmentation/reassembling means SAR and from which this (video) digital signal is in turn read out with the time-regenerated clock output by the clock recovery means CR. The video digital signal clock-regenerated in this way then proceeds to a video decoder Dec to which, finally, the video receiver TV of the appertaining subscriber is connected. Analog CATV distribution signals are directly supplied to the video receiver TV from the RF separator/combiner RF-S/C.

In conclusion, let it also be noted that a wireless transmission of a reference frequency is also possible, departing from the above specification. This can occur in such a way that all digital signal sources (VS in FIG. 1) and network termination units (NT/A in FIG. 1 and FIG. 3), coming into consideration are radio-synchronized by a central clock generator. Such a radio synchronization is fundamentally known from the technology of radio-controlled clocks and therefore need not be set forth in greater detail here.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for a receive-side clock supply for digital signals, comprising the steps of:

transmitting digital signals from at least one digital signal source via a connection unit and via at least one of a light waveguide tree network and/or coaxial line tree network, shared respectively in common by a plurality of subscriber-side network termination units, to the subscriber-side network termination units in the form of ATM signals;

transmitting a signal clock, separate from the ATM digital signals, at least from the connection unit to each of the network termination units connected to the light waveguide tree network and/or coaxial line tree network; receiving the transmitted clock signal and the transmitted ATM signals in each of the network termination units; and time-regenerating, using the received clock signal, the digital signals acquired from received ATM cells in the received ATM signals in the network termination units.

2. The method according claim 1, wherein the method further comprises transmitting the signal clock over the light waveguide tree network and/or coaxial line tree network to all network termination units connected thereto in the form of pilot signals proceeding from the connection unit.

3. The method according to claim 2, wherein each of the pilot signals has a respective pilot frequency and wherein the method further comprises directly deriving each clock frequency from a pilot signal transmitted to the subscriber-side termination units via the light waveguide tree network and/or the coaxial tree network in a frequency range that is not utilized for transmission of signals.

4. The method according to claim 3, wherein the method further comprises the pilot frequencies having values that are whole number fractions or that are whole number multiples of values of the clock frequencies.

5. The method according to claim 2, wherein the method further comprises the pilot frequencies being numerically unrelated to the clock frequencies, and modulating the pilot frequencies with the clock frequencies.

6. The method according to claim 1, wherein given frequency synchronization of digital signal sources and of the connection unit via a common network clock, clock frequencies, that are numerically derived from clock frequency of the network clock transmitted downstream to all network termination units, are employed for the digital signals.

7. The method according to claim 1, wherein a reference frequency is wirelessly transmitted for a plurality of digital signal sources and associated network termination units.

8. The method according to claim 1, wherein the digital signals are digital, data-compressed television distribution signals and wherein the digital signal source is a television signal source.

9. A method for a receive-side clock supply for digital signals, comprising the steps of: transmitting digital signals from at least one digital signal source via a connection unit and via at least one of a light waveguide tree network and/or coaxial line tree network, shared respectively in common by a plurality of subscriber-side network termination units, to the subscriber-side network termination units in the form of ATM signals; transmitting a signal clock, separate from the ATM digital signal, in the form of pilot signals from the connection unit to each of the network termination units connected to the light waveguide tree network and/or coaxial line tree network; receiving the transmitted clock signal and the transmitted ATM signals in each of the network termination units; and time-regenerating, using the received clock signal, digital signals acquired from received ATM cells in the received ATM signals in the network termination units.

10. The method according claim 9, wherein each of the pilot signals has a respective pilot frequency and wherein the method further comprises directly deriving each clock frequency from a pilot signal transmitted to the subscriber-side termination units via the light waveguide tree network and/or the coaxial tree network in a frequency range that is not utilized for transmission of signals.

11. The method according claim 10, wherein the method further comprises the pilot frequencies having values that are whole number fractions or that are whole number multiples of values of the clock frequencies.

12. The method according claim 9, wherein the method further comprises the pilot frequencies being numerically unrelated to the clock frequencies, and modulating the pilot frequencies with the clock frequencies.

13. The method according claim 9, wherein given frequency synchronization of digital signal sources and of the connection unit via a common network clock, clock frequencies, that are numerically derived from a clock frequency of the network clock transmitted downstream to all network termination units, are employed for the digital signals.

14. The method according claim 9, wherein a reference frequency is wirelessly transmitted for a plurality of digital signal sources and associated network termination units.

15. A method for a receive-side clock supply for digital data-compressed television distribution signals, comprising the steps of: transmitting digital signals from television signal sources via a connection unit and via at least one of a light waveguide tree network and/or coaxial line tree network, shared respectively in common by a plurality of subscriber-side network termination units, to the subscriber-side network termination units in the form of ATM signals; transmitting a signal clock, separate from the ATM digital signals, in the form of pilot signals from the connection unit to each of the network termination units connected to the light waveguide tree network and/or coaxial line tree network; receiving the transmitted clock signal and the transmitted ATM signals in each of the network termination units; and time-regenerating, using the received clock signal, the digital data-compressed television distribution signals acquired from the received ATM cells in the received ATM signals in the network termination units, wherein given frequency synchronization of television signal sources and of the connection unit via a common network clock, clock frequencies, that are numerically derived from a clock frequency of the network clock transmitted downstream to all network termination units, are employed for the digital data-compressed television distribution signals.

16. The method according claim 15, wherein each of the pilot signals has a respective pilot frequency and wherein the method further comprises directly deriving each clock frequency from a pilot signal transmitted to the subscriber-side termination units via the light waveguide tree network and/or the coaxial tree network in a frequency range that is not utilized for transmission of signals.

17. The method according claim 16, wherein the method further comprises the pilot frequencies having values that are whole number fractions or that are whole number multiples of values of the clock frequencies.

18. The method according claim 15, wherein the method further comprises the pilot frequencies being numerically unrelated to the clock frequencies, and modulating the pilot frequencies with the clock frequencies.

19. The method according claim 15, wherein a reference frequency is wirelessly transmitted for a plurality of television signal sources and associated network termination units.

* * * * *